United States Patent
Lin et al.

(10) Patent No.: US 9,343,023 B2
(45) Date of Patent: May 17, 2016

(54) STEREOSCOPIC DISPLAY HAVING A GRAY LEVEL ZONE AND A METHOD FOR DRIVING THE SAME

(71) Applicant: AU Optronics Corporation, Hsin-Chu (TW)

(72) Inventors: Chiung-Liang Lin, Hsin-Chu (TW); Hsuan-I Wu, Hsin-Chu (TW); Ching-Tsun Chang, Hsin-Chu (TW); Jeng-Yi Huang, Hsin-Chu (TW)

(73) Assignee: AU OPTRONICS CORPORATION, Hsin-chu (TW)

( * ) Notice: Subject to any disclaimer, the term of this patent is extended or adjusted under 35 U.S.C. 154(b) by 121 days.

(21) Appl. No.: 14/258,158

(22) Filed: Apr. 22, 2014

(65) Prior Publication Data

US 2015/0054860 A1 Feb. 26, 2015

(30) Foreign Application Priority Data

Aug. 23, 2013 (TW) .............................. 102130297 A

(51) Int. Cl.
G09G 5/00 (2006.01)
G09G 3/36 (2006.01)
G09G 3/00 (2006.01)
H04N 13/04 (2006.01)

(52) U.S. Cl.
CPC .............. *G09G 3/3607* (2013.01); *G09G 3/003* (2013.01); *H04N 13/0413* (2013.01); *H04N 13/0497* (2013.01); *G09G 2310/027* (2013.01); *G09G 2354/00* (2013.01)

(58) Field of Classification Search
CPC .. G09G 5/14; H04N 13/0033; H04N 13/0225
USPC ............................................................ 345/6
See application file for complete search history.

(56) References Cited

U.S. PATENT DOCUMENTS

| 8,334,896 | B2 | 12/2012 | Park et al. | |
|---|---|---|---|---|
| 2007/0146603 | A1* | 6/2007 | Uehara | G02F 1/134363 349/141 |
| 2011/0006979 | A1* | 1/2011 | Min | G09G 3/36 345/156 |
| 2011/0157167 | A1* | 6/2011 | Bennett | G09G 3/20 345/76 |
| 2012/0105748 | A1* | 5/2012 | Huang | G02F 1/134309 349/15 |
| 2012/0320171 | A1 | 12/2012 | Lee et al. | |
| 2013/0076724 | A1* | 3/2013 | Park | G09G 3/20 345/87 |

(Continued)

FOREIGN PATENT DOCUMENTS

| CN | 102998805 | 3/2013 |
|---|---|---|
| CN | 103165087 | 6/2013 |

*Primary Examiner* — Adam J Snyder
(74) *Attorney, Agent, or Firm* — WPAT, P.C.; Justin King; Douglas A. Hosack

(57) ABSTRACT

A stereoscopic display and a driving method are disclosed herein. The stereoscopic display includes a sensor, a barrier cell, and a control unit. The sensor is configured to detect a user to generate a sensing signal. The barrier cell is configured to generate a 3D image with a 2D image. The barrier cell includes barrier pitches disposed in parallel. Each of the barrier pitches includes switchable barrier units. The control unit is configured to generate control signals to adjust the switchable barrier units according to the sensing signal, so as to make at least one of the switchable barrier units of each of barrier pitches form a shading zone, to make the switchable barrier units disposed at the two adjacent sides of the shading zone form a gray level zone, and to make the rest of the switchable barrier units in the same barrier pitch form a photic zone.

11 Claims, 10 Drawing Sheets

(56) References Cited

U.S. PATENT DOCUMENTS

| | | | |
|---|---|---|---|
| 2013/0120351 A1* | 5/2013 | Yoon | G09G 3/003 345/212 |
| 2013/0148045 A1 | 6/2013 | Ohyama et al. | |
| 2013/0222713 A1* | 8/2013 | Park | G09G 3/3611 349/15 |
| 2014/0022475 A1* | 1/2014 | Gotoh | G02F 1/134309 349/33 |
| 2014/0118824 A1 | 5/2014 | Hsieh et al. | |

* cited by examiner

STEREOSCOPIC DISPLAY HAVING A GRAY LEVEL ZONE AND A METHOD FOR DRIVING THE SAME

RELATED APPLICATIONS

This application claims priority to Taiwan Application Serial Number 102130297, filed Aug. 23, 2013, which is herein incorporated by reference.

BACKGROUND

1. Field of Invention

The present invention relates to a stereoscopic display. More particularly, the present invention relates to a stereoscopic display having a gray level zone.

2. Description of Related Art

A conventional stereoscopic display (also 3D display) is implemented with a parallax barrier. Reference is made to FIG. 1A. FIG. 1A is a schematic diagram of the stereoscopic display 100 used in some approaches. As shown in FIG. 1A a 2D image is generated from a pixel layer 140, and the states of the parallax barrier cell 120 are changed to form a photic zone 102 or a shading zone 104. Thus, a better 3D image is provided to a user.

A liquid crystal (LC) barrier cell is commonly used to realize the parallax barrier cell. As shown in FIG. 1A, the parallax barrier cell 120 is twist nematic (TN) type liquid crystal barrier cell. By applying a driving voltage to the electrodes on opposite sides of the parallax barrier cell 120 (hereinafter referred to as "opposing electrodes"), shading zones 104 or photic zones 102 are able to be formed on the switchable barrier units 122. For illustration, if the parallax barrier cell 120 is a normally white LC, and a driving voltage is not applied to the opposing electrodes, the photic zones 102 are formed. Alternatively, if the driving voltage is applied to the opposing electrodes, the shading zones 104 are formed.

However, when the viewing position of the user changes (i.e., the positions of the user's eyes change), the positions of the photic zones 102 must be changed. That is, the driving voltages on each of the switchable barrier units 122 must be changed correspondingly, so as to allow the user to see a better 3D image. When the photic zones 102 and the shading zones 104 are switched (i.e., from the first mode to the second mode in FIG. 1A), the luminance of the image is changed, resulting in flickers on the screen.

FIG. 1B is a graph illustrating a relation curve of a visual angle and an average luminance. FIG. 1C is a schematic diagram of the luminance of the switchable barrier units being changed when the switchable barrier units are switched. There are two major reasons to make the luminance change. The first reason relates to the angular intensity being non-uniform. As shown in FIG. 1B, when the first mode is switched to the second mode, the switching operation is not able to be performed at a precise switching angle. Thus, the luminance of the first mode and the luminance of the second mode are different with respect to the same visual angle result in flickers on the screen. The second reason relates to the on-time and the off-time of the LC barrier cell being different. For example, as shown in FIG. 1C, when switching in two modes, the switchable barrier units 122 are able to be switched fast from the photic zones 102 to the shading zones 104. However, it takes a longer time for the switchable barrier units 122 to be switched from the shading zones 104 to the photic zones 102.

In addition, in FIG. 1A, a unity barrier pitch is set to include 8 groups of the switchable barrier units. In general, the greater the number of groups of the switchable barrier units, the smoother the switching of the image. However, due to the increasingly smaller pixel structure in modern high-resolution panels, the number of groups of the switchable barrier units is limited due to the manufacturing process. When the number of the groups of the switchable barrier units is insufficient, crosstalk increases, which results in a decrease in the smoothness of image switching.

Therefore, a heretofore-unaddressed need exists to address the aforementioned deficiencies and inadequacies.

SUMMARY

One aspect of the present disclosure is to provide a stereoscopic display. The stereoscopic display includes a barrier cell, a sensor and a control unit. The barrier cell is configured to generate a grating-like structure to form a 3D image with a 2D image. The barrier cell includes barrier pitches disposed in parallel, and each of the barrier pitches includes switchable barrier units. The sensor is configured to detect a user to generate a sensing signal. The control unit is configured to calculate a visual angle of the user in accordance with the sensing signal, and accordingly generate control signals in accordance with the visual angle to adjust the switchable barrier units, so as to make at least one of the switchable barrier units of each of the barrier pitches form a shading zone, to make the switchable barrier units disposed at two adjacent sides of the shading zone form a gray level zone, and to make the rest of the switchable barrier units in the same barrier pitch form a photic zone.

Another aspect of the present disclosure is to provide a driving method for a stereoscopic display. The stereoscopic display includes a barrier cell, the barrier cell includes barrier pitches disposed in parallel, and each of the barrier pitches includes switchable barrier units. The driving method includes the following steps: generating a sensing signal by utilizing a sensor to detect a user; calculating a visual angle of the user by utilizing a control unit to process the sensing signal; and adjusting the switchable barrier units to make at least one of the switchable barrier units of each of the barrier pitches form a shading zone, to make the switchable barrier units disposed at two adjacent sides of the shading zone form a gray level zone, and to make the rest of the switchable barrier units in the same barrier pitch form a photic zone.

In summary, the present disclosure has significant advantages and improved performance compared to the prior art. The present disclosure realizes significant technological progress and offers high value in this industry. The stereoscopic display and the driving method of the present disclosure include many driving configurations to reduce screen flicker, and may be applied to high-resolution displays.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
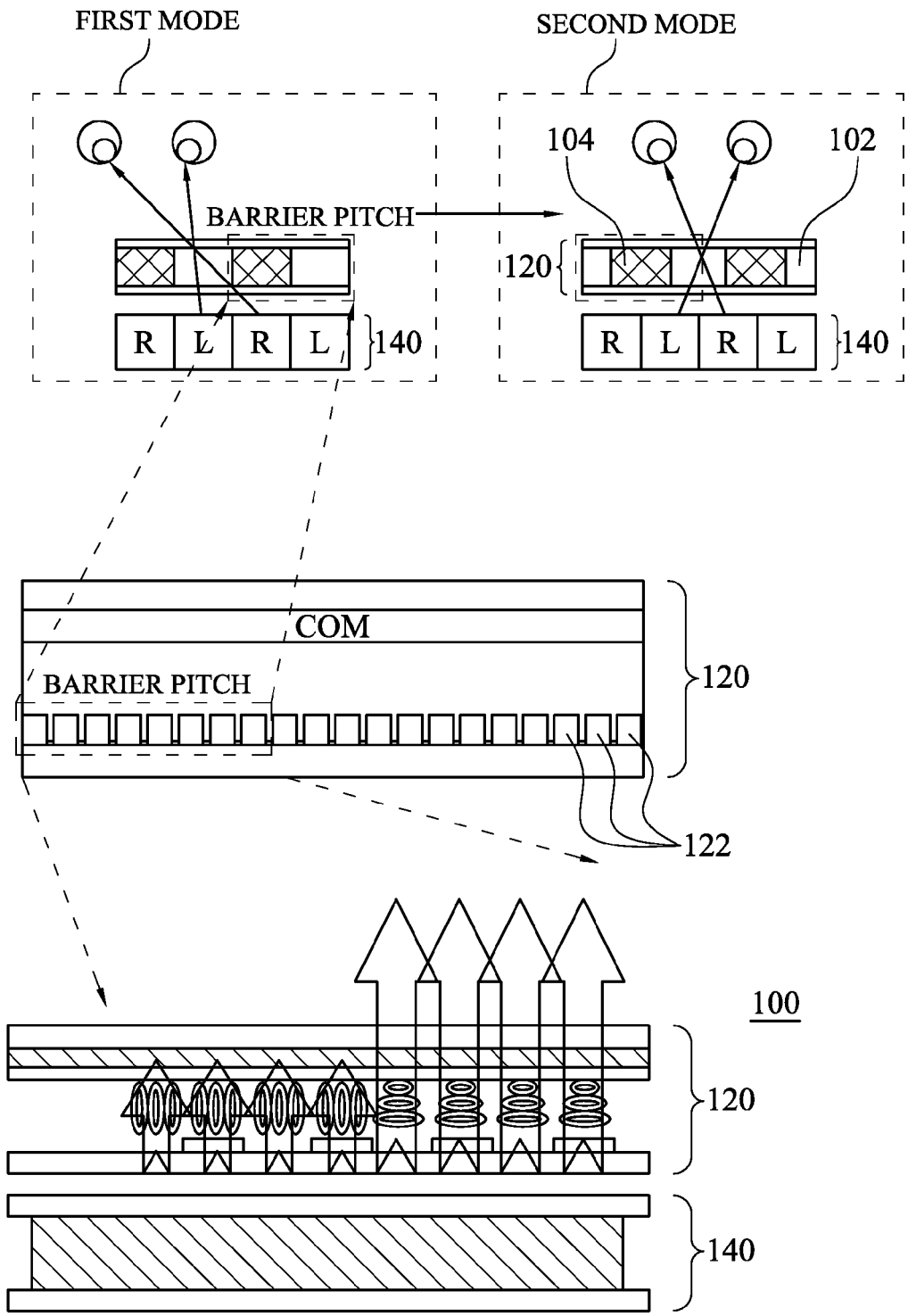
FIG. 1A is a schematic diagram of a stereoscopic display used in some approaches.
Figure 1B:
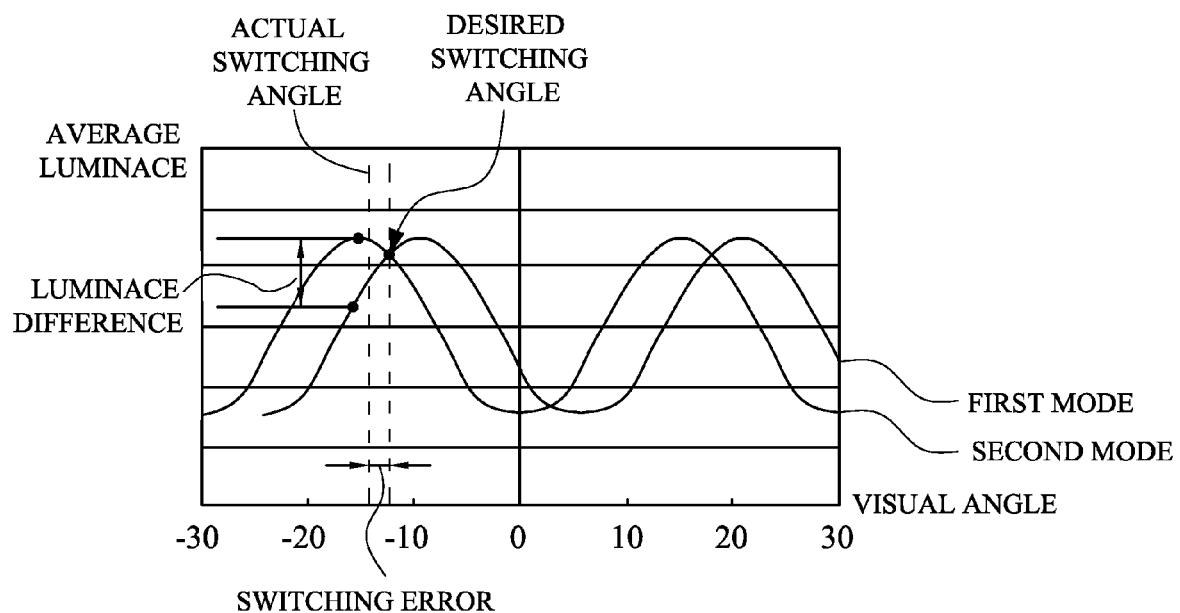
FIG. 1B is a graph illustrating a relation curve of a visual angle and an average luminance.
Figure 1C:
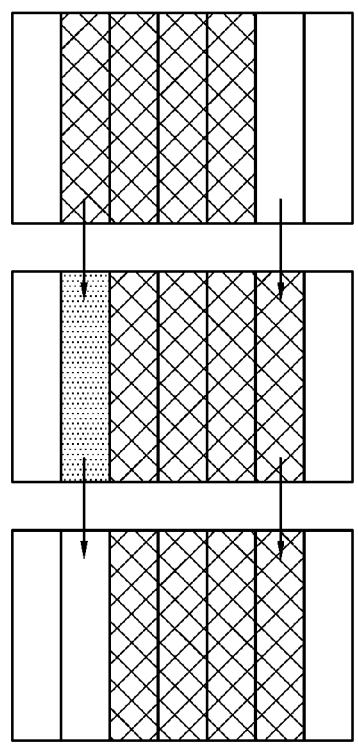
FIG. 1C is a schematic diagram of the luminance of switchable barrier units being changed when the switchable barrier units are switched.

Reference will now be made in detail to the present embodiments of the invention, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

Figure 2A:
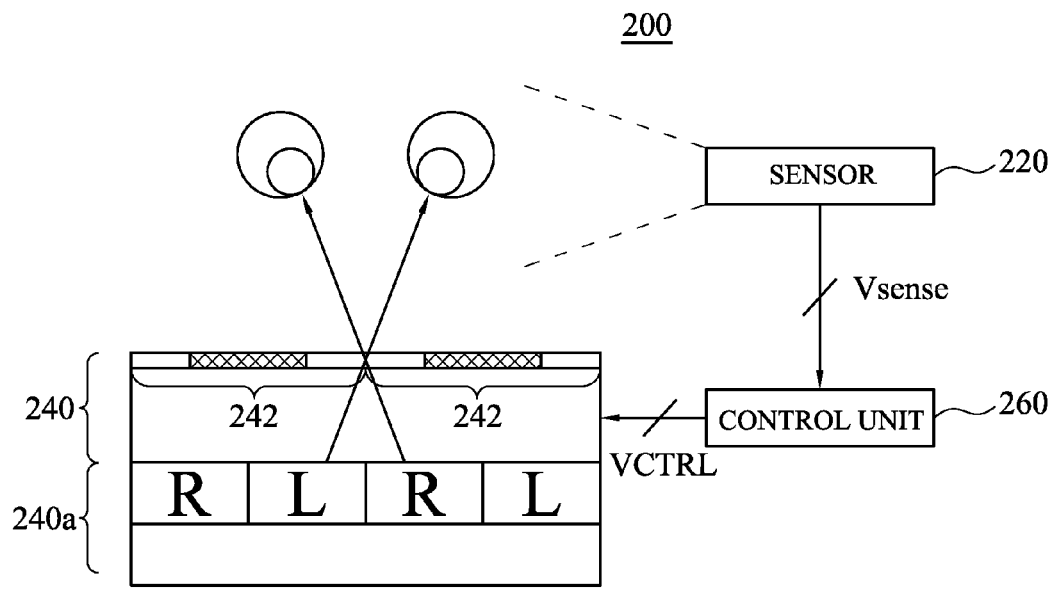
FIG. 2A is a schematic diagram of a stereoscopic display in accordance with one embodiment of the present disclosure.

FIG. 2A is a schematic diagram of a stereoscopic display 200 in accordance with one embodiment of the present disclosure. As shown in FIG. 2A, the stereoscopic display 200 (also called as 3D display) includes a sensor 220, a barrier cell 240, and a control unit 260. The sensor 220 is configured to detect a user, and in response generates a sensing signal Vsense and transmits the same to the control unit 260. The barrier cell 240 is configured to generate a gratings-like structure to form a 3D image, in which the 2D image may be generated from the pixel layer 240a in FIG. 2A. The barrier cell 240 may be the aforementioned TN cell. The barrier cell 240 includes barrier pitches 242 disposed in parallel. Each of the barrier pitches 242 includes switchable barrier units (not shown in FIG. 2A). The control unit 260 is configured to generate control signals VCTRL in accordance with the sensing signal Vsense, so as to make at least one of the switchable barrier units of each of the barrier pitches 242 form a shading zone, to make the switchable barrier units disposed at two adjacent sides of the shading zone form a gray level zone, and to make the rest of the switchable barrier units in the same barrier pitch 242 form a photic zone.

Figure 2B:
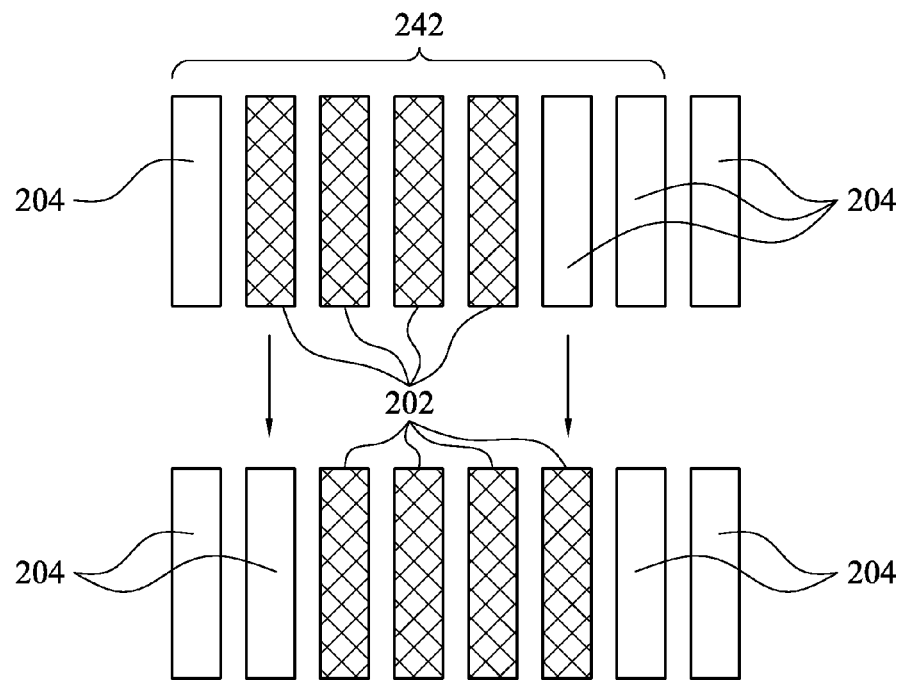
FIG. 2B is a graph illustrating mode switching of a stereoscopic display used in some approaches.
Figure 2C:
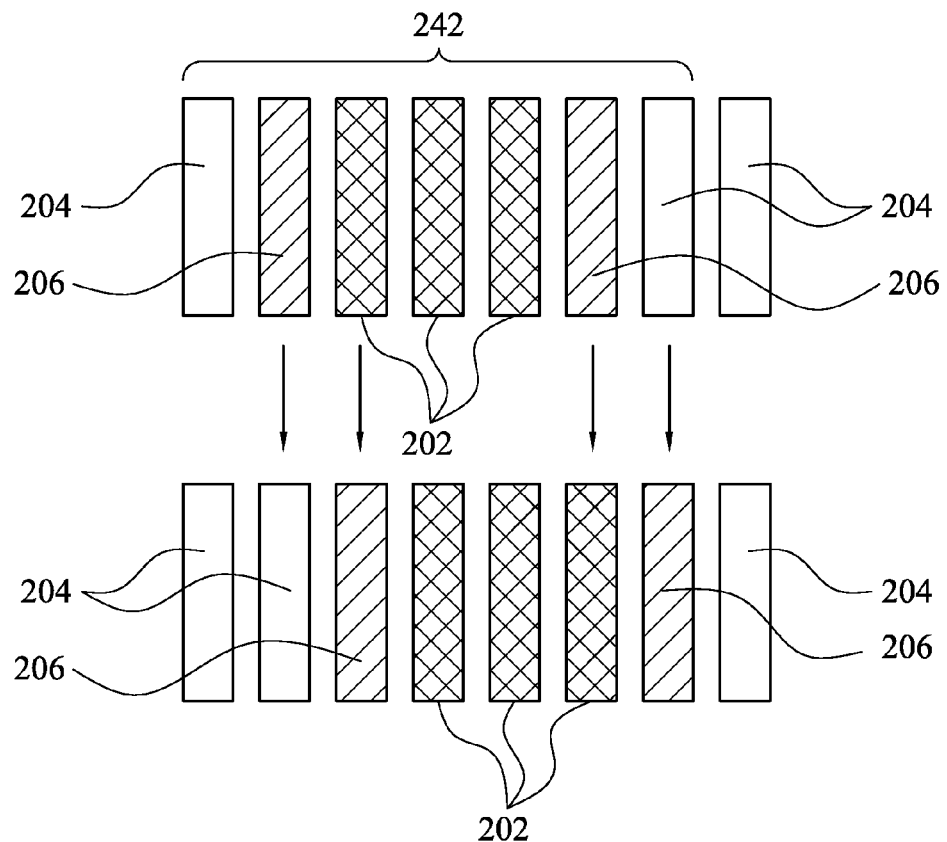
FIG. 2C is a graph illustrating mode switching of the stereoscopic display in FIG. 2A in accordance with one embodiment of the present disclosure.

FIG. 2B is a graph illustrating mode switching of a stereoscopic display. FIG. 2C is a graph illustrating mode switching of the stereoscopic display 200 in FIG. 2A in accordance with one embodiment of the present disclosure. As shown in FIG. 2B, when switching the state of the gratings, the stereoscopic display switches the gratings from the shading zone 202 to the photic zone 204 directly, or from the photic zone 204 to the shading zone 202 directly. As mentioned above, flickers are caused due to the on-time and the off-time of the barrier cell 240 is different. As shown in FIG. 2C, when switching the state of the gratings (i.e., the switchable barrier units), the stereoscopic display 200 switches the gratings having changes in states to the gray level zone 206. For illustration, the gratings are switched from the shading zone 202 to the gray level zone 206 or from the photic zone 204 to the gray level zone 206. With the configuration of the gray level zone 206, the difference between the on-time and the off-time of the barrier is reduced, and thus the problem of flicker is improved.

Figure 2D:
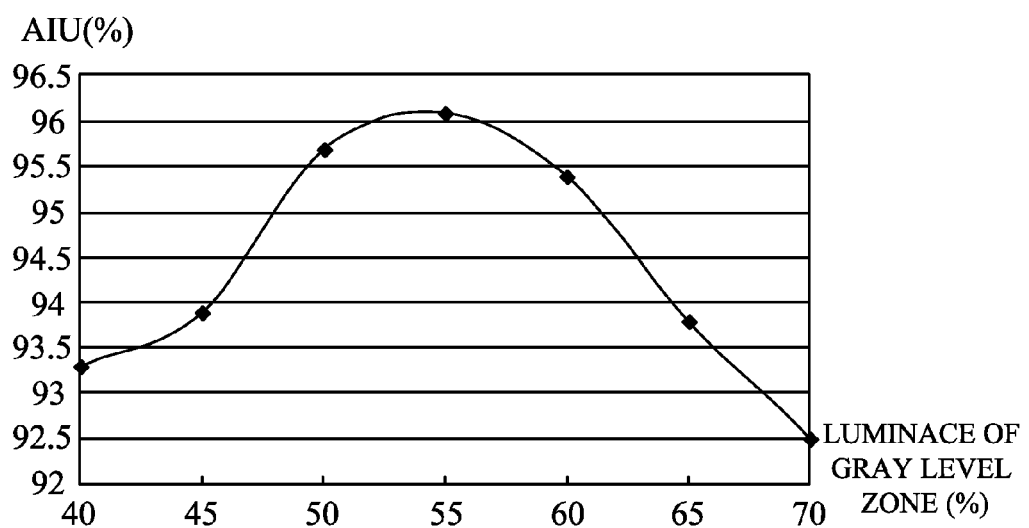
FIG. 2D is a graph illustrating a relation curve of an angular intensity uniformity of the stereoscopic display in FIG. 2A and a luminance of a gray level zone.

FIG. 2D is a graph illustrating a relation curve of an angular intensity uniformity of the stereoscopic display 200 in FIG. 2A and a luminance of the gray level zone 206. Angular intensity uniformity (AIU) is defined as the ratio between minimum and maximum ratios of the luminance of the 3D image to the luminance of the 2D image that are measured at different visual angles. Ideally, AIU is 100%, which means the luminance is uniform at all visual angles. As shown in FIG. 2D, with the configuration of the gray level zone 206, the problem of non-uniform luminance at different visual angles in the stereoscopic display 200 is improved.

The following paragraphs in the present disclosure provide numerous embodiments which are able to implement the functions and operations of the stereoscopic display 200. However, the present disclosure is not limited thereto.

Figure 3:
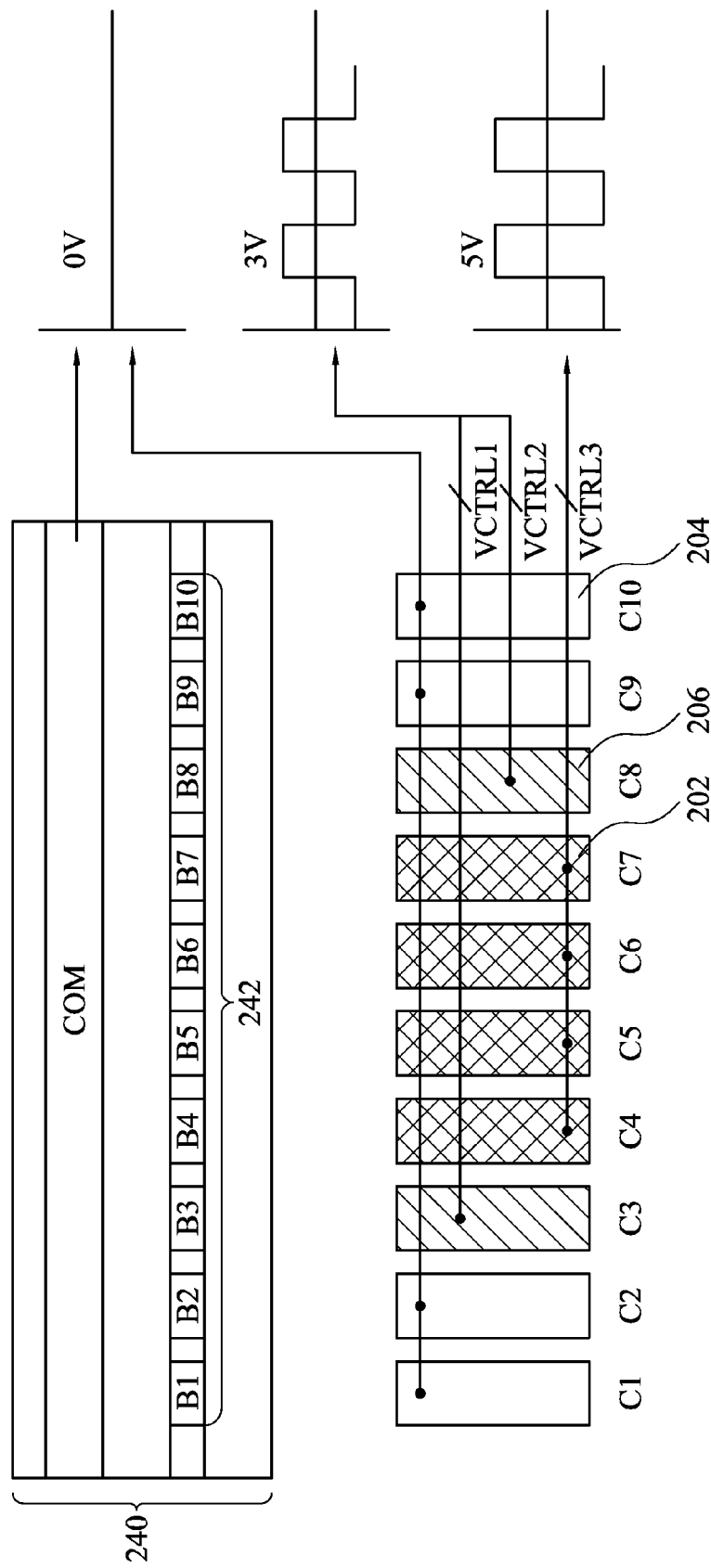
FIG. 3 is a schematic diagram of a barrier cell in FIG. 2A in accordance with one embodiment of the present disclosure.

FIG. 3 is a schematic diagram of the barrier cell 240 in FIG. 2A in accordance with one embodiment of the present disclosure. Each of the switchable barrier units includes control electrodes Cn (i.e., C1-C10) and a common electrode COM. The common electrodes COM of the switchable barrier units are electrically coupled to each other and are at the same electric potential. The control electrodes Cn of the corresponding switchable barrier units of each barrier pitch 242 are electrically coupled to each other, so as to be at the same electric potential. For illustrative purpose, FIG. 3 only illustrates one barrier pitch 242. It is assumed that the barrier pitch 242 includes 10 sets of the switchable barrier units B1-B10 corresponding to the control electrodes C1-10, in which the switchable barrier units B4-B7 are the shading zone 202, the switchable barrier units B1, B2, B9 and B10 are the photic zone 204, and the switchable barrier units B3 and B8 are the gray level zone 206. In this embodiment, the control unit 260 is configured to generate a voltage, the control signal VCTRL1, the control signal VCTRL2 and the control signal VCTRL3 in accordance with the visual angle determined from the sensing signal Vsense. The voltage is applied to each of the common electrode COM and the control electrodes C1, C2, C9 and C10 of the switchable barrier units B1, B2, B9 and B10, so as to form the photic zone 204. The control units 260 provide the control signals VCTRL1 and VCTRL2 to the control electrodes C3 and C8 of the switchable barrier units B3 and B8 at the two adjacent sides of the shading zone 202, so as to form the gray level zone 206. The control signal VCTRL 3 is applied to the control electrodes C4-C7 of the switchable barrier units B4-B7, so as to form the shading zone 202.

For illustration, as shown in FIG. 3, the voltage applied to the common electrode COM is set to 0 Volts, the voltage amplitude of the control signals VCTRL1 and VCTRL2 is set to 3 Volts, and the voltage amplitude of the control signal VCTRL3 is set to 5V. The gray level zone 206 is generated by using the control signals VCTRL1 and VCTRL2 with a middle voltage level. When the gratings are switched, the problems of crosstalk or AIU being changed significantly are thus improved.

Figure 4A:
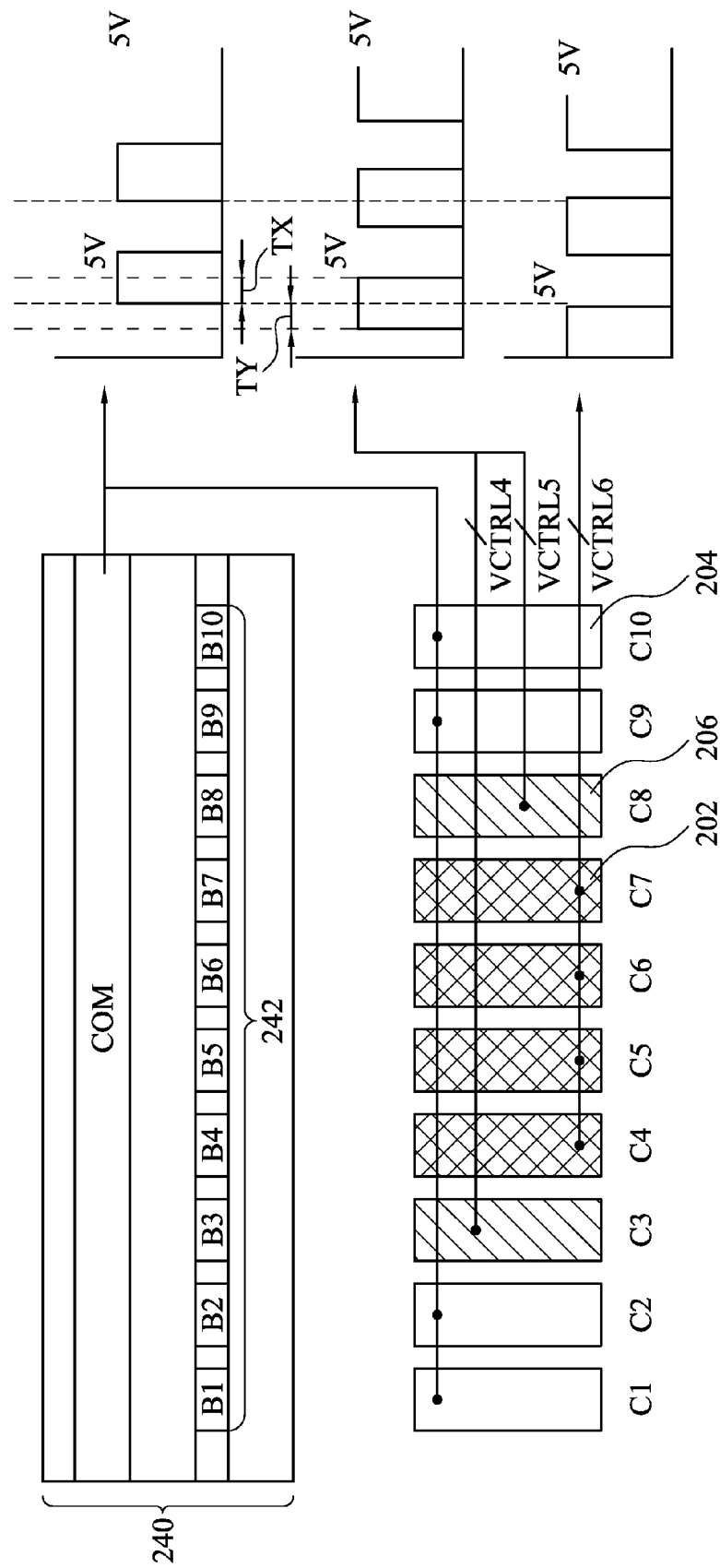
FIG. 4A is a schematic diagram of the barrier cell in FIG. 2A in accordance with one embodiment of the present disclosure.

FIG. 4A is a schematic diagram of the barrier cell 240 in FIG. 2A in accordance with one embodiment of the present disclosure. Compared with the configuration of the middle voltage level illustrated in the embodiment above, in this embodiment, the control unit 260 generates a common control signal VCTRLCOM and the control signals VCTRL4, VCLRL5, and VCTRL 6 in accordance with the sensing signal Vsense. The common control signal VCTRLCOM is applied to each of the common electrode COM and the control electrodes C1, C2, C9 and C10 of the switchable barrier units B1, B2, B9 and B10, so as to form the photic zone 204. The control unit 260 is further configured to generate the control signal VCTRL6 and apply the same to each of the control electrodes C4-C7 of the switchable barrier units B4-B7, so as to form the shading zone 202 in accordance with the sensing signal Vsense. As shown in FIG. 4A, the common control signal VCTRLCOM is complementary to the control signal VCTRL6. An enabling period of the control signals VCTRL4 and VCTRL5 at least partly overlaps the enabling period of the common control signal VCTRLCOM. Accordingly, a phase difference is made by setting the delay time, and the mixed effect of the shading zone 202 and the photic zone 204 is generated in the enabling period of the control signal VCTRL4 and VCTRL5, and the gray level zone 206 is thus generated.

For illustration, as shown in FIG. 4A, the voltage amplitude of each of the control signals is set to 5 Volts, the frequency of each of the control signals is the same, and the phase difference between the control signals VCTRL4 and VCTRL5 and the common control signal VCTRLCOM is 90 degrees. In this example, the overlapping time between the enabling period of the control signals VCTRL4 and VCTRL5 and the enabling period of the common control signal VCTRLCOM is the time that the switchable barrier units B3 and B8 form the photic zone 204 (denoted as the photic time TX), in which the driving voltage difference between the opposing substrates of the switchable barrier units B3 and B8 is 0 Volts. Alternatively, the non-overlapping time between the enabling period of the control signals VCTRL4 and VCTRL5 and the enabling period of the common control signal VCTRLCOM is the time that the switchable barrier units form the shading zone 202 (denoted as the shading time TY). A half time of each duty cycle of the switchable barrier units required to be switched is at the shading zone 202, and another half time of the same is at the photic zone 204. Thus, the effect of the gray level zone 206 is obtained.

Figure 4B:
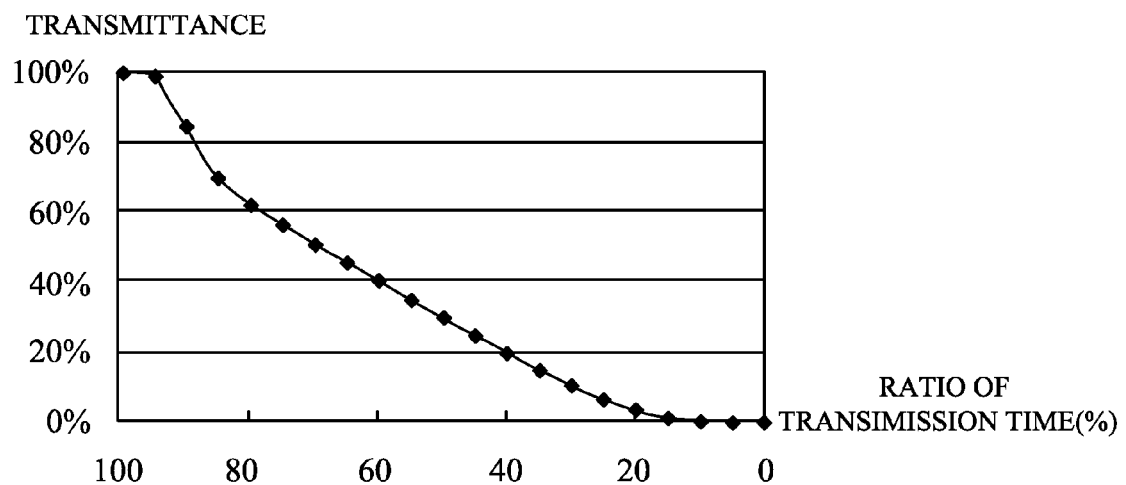
FIG. 4B is a graph illustrating a relation curve of photic time TX, shading time TY and a transmittance in accordance with the embodiment illustrated in FIG. 4A.

FIG. 4B is a graph illustrating a relation curve of the photic time TX, the shading time TY and a transmittance in accordance with the embodiment illustrated in FIG. 4A. A ratio of the transmission time is defined as TX/(TX+TY), which indicates a ratio of the photic time TX to a unity duty cycle time for switching. The transmittance represents the light penetration rate of the 2D image. When the transmittance is 100%, the switchable barrier unit operates in the photic zone 204. Alternatively, when the transmittance is 0%, the switchable barrier unit operates in the shading zone 202. As shown in FIG. 4B, the overlapping time between the enabling period of the control signals VCTRL4 and CTRLVCTRL5 and the enabling period of the common control signal VCTRLCOM is able to be adjusted according to requirements of practical applications, so as to adjust the ratio of the transmission time to generate the gray level zone 206 with different luminance.

Figure 4C:
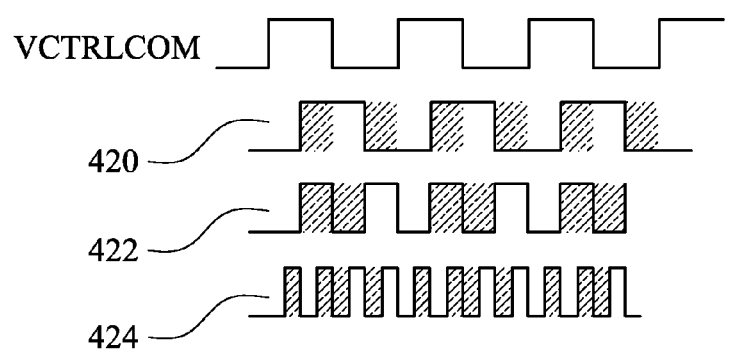
FIG. 4C is a schematic diagram illustrating a configuration of control signals VCTRL4 and VCTRL5 in accordance with the embodiment illustrated in FIG. 4A.

FIG. 4C is a schematic diagram illustrating a configuration of the control signals VCTRL4 and VCTRL5 in accordance with the embodiment illustrated in FIG. 4A. In previous embodiments, there are many ways to configure the control signals VCTRL4 and VCTRL5. As shown in FIG. 4C, when the frequency of the control signals VCTRL4 and VCTRL5 and the frequency of the common control signal VCTRLCOM are the same, the control signals VCTRL4 and VCTRL5 are able to be configured as described in the embodiments above (e.g., wave 420). When the frequency of the control signals VCTRL4 and VCTRL5 and the frequency of the common control signal VCTRLCOM are different, the control signals VCTRL4 and VCTRL5 are able to be configured as the wave 422 or wave 424, in which the photic time TX and the shading time TY are configured in the enabling period of the common control signal VCTRLCOM on average. The configurations described above are only for illustrative purposes, and the present disclosure is not limited thereto. Persons having ordinary skill in the art are able to utilize any one of the configurations.

Figure 5A:
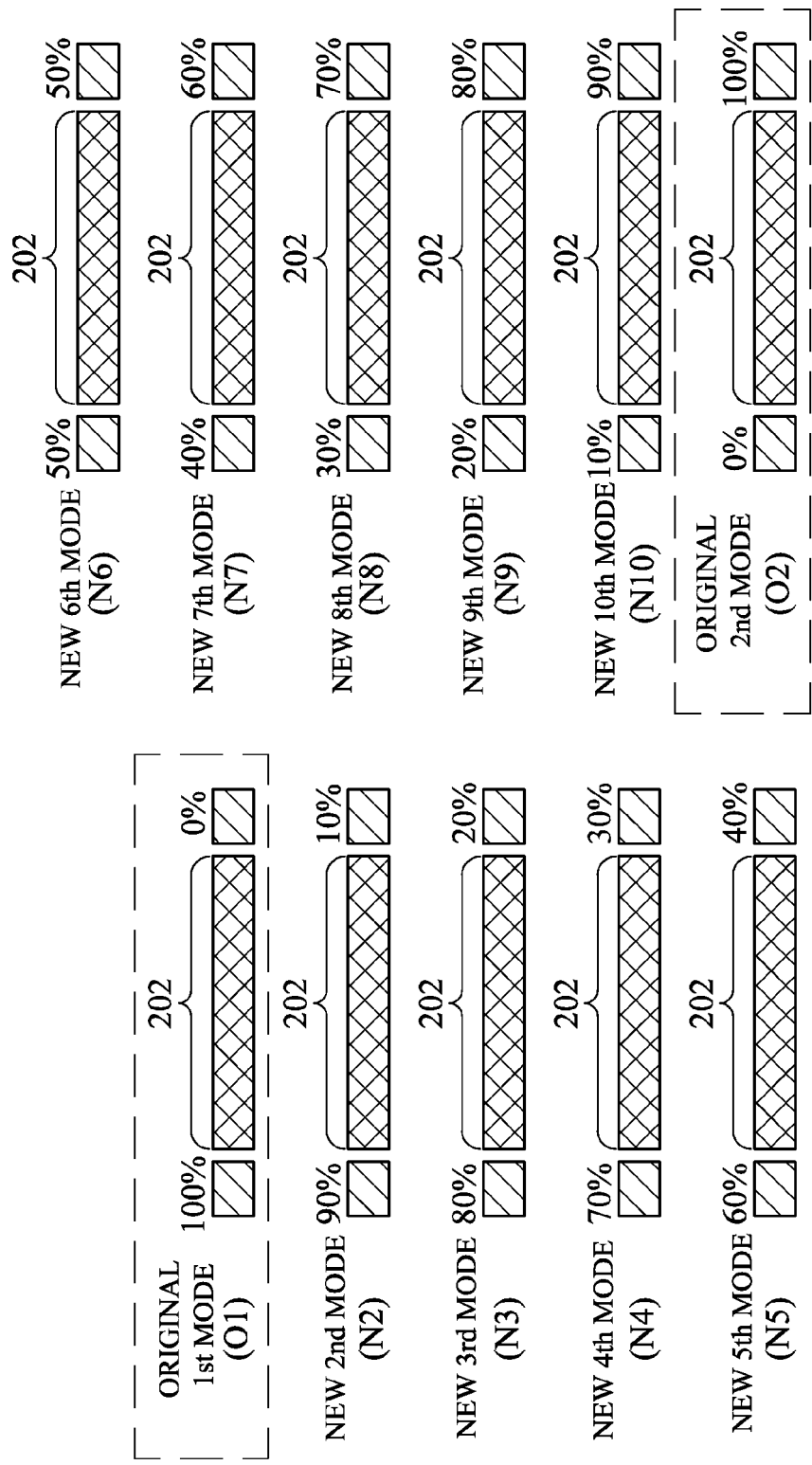
FIG. 5A is a schematic diagram illustrating increasing the number of switching groups in accordance with one embodiment of the present disclosure.

Furthermore, the luminance of the gray level zone 206 is able to be gradually increased, so as to achieve an effect of equivalently increasing the groups of the switchable barrier units in one barrier pitch 242. Reference is made to FIG. 5A. FIG. 5A is a schematic diagram illustrating increasing the number of the switching groups in accordance with one embodiment of the present disclosure. The original first mode and the original second mode shown in FIG. 5A correspond to the stereoscopic display 100 used in some approaches, namely, from the shading zone 202 (the transmittance is 0%) switched to the photic zone 204 (the transmittance is 100%) directly or from the photic zone 204 (the transmittance is 100%) switched to the shading zone 202 (the transmittance is 0%) directly. In this embodiment, the transmittance of the switchable barrier units at both sides of the shading zone 202 is able to be adjusted gradually, so as to increase the groups to be switched equivalently. As shown in FIG. 5A, when switching at the original first mode, the transmittance of one of the switchable barrier units at both sides of the shading zone 202 is set to 90%, and another one of the switchable barrier units at both sides of the shading zone 202 is set to 10% (the operations above are denoted as a new second mode). The rest may be deduced by analogy. Whenever switching the modes, the transmittance of the switchable barrier units at the two adjacent sides of the shading zone 202 is adjusted by 10%. Extra 9 modes are thus equivalently added, which are able to increase the accuracy of the correspondence between the visual angle of the user and the position of the photic zone 204 of the barrier cell 240. Thus, the smoothness of switching images is improved.

Figure 5B:
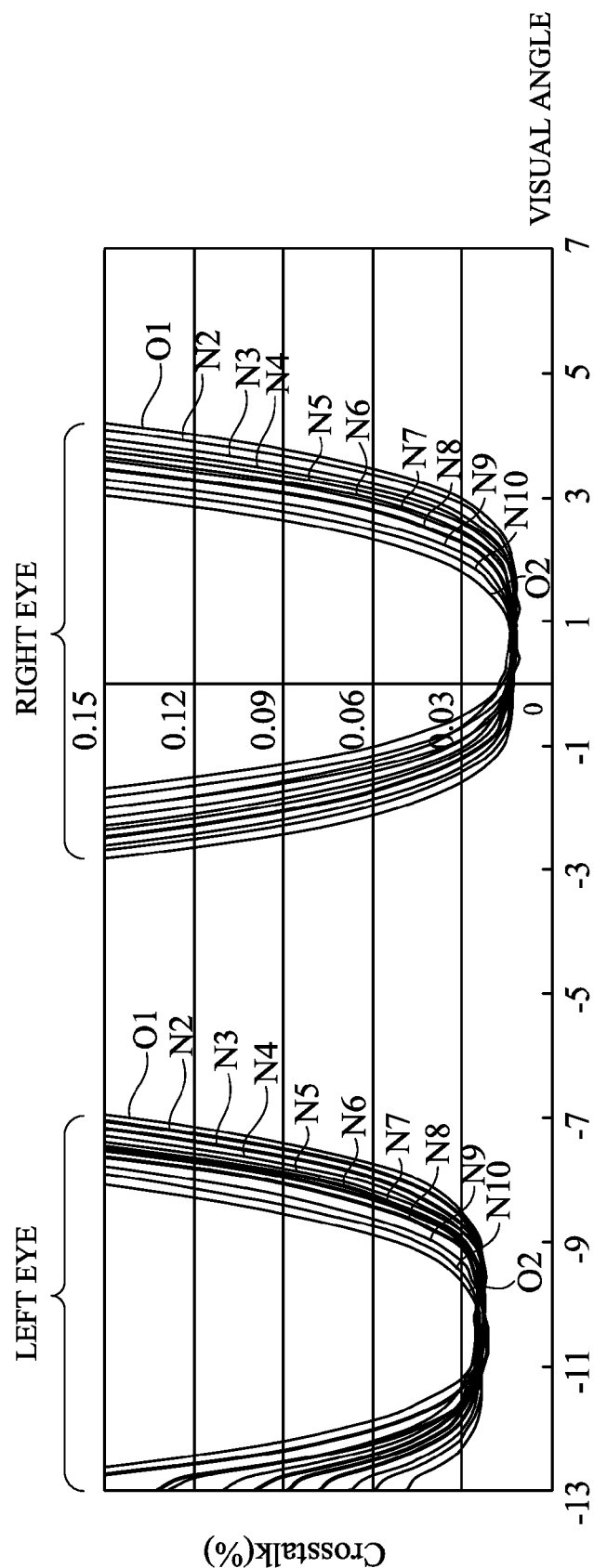
FIG. 5B is a graph illustrating a relation curve of visual angles of the right eye and left eye of a user in each mode in FIG. 5A and a crosstalk performance in accordance with one embodiment of the present disclosure.

FIG. 5B is a graph illustrating a relation curve of the visual angles of the right eye and left eye of a user in each mode in FIG. 5A and a crosstalk performance in accordance with one embodiment of the present disclosure. The control unit 260 is further configured to sequentially switch the switchable barrier units to each mode in accordance with the visual angle of a user, so as to cause the current mode to be switched to the mode having the lowest crosstalk performance corresponding to the visual angle. Thus, the quality of the 3D image is improved.

Taking FIG. 3 as a example, whenever the switchable barrier units are switched, the control unit 260 sequentially increases the voltage amplitude of one of the control signal VCTRL1 and the control signal VCTRL2, and sequentially decreases the voltage amplitude of another one of the control signal VCTRL1 and the control signal VCTRLRL2, so as to perform the operation of sequentially changing the luminance of the gray level zone 206. For example, when switching to the new second switch mode, the voltage amplitude of the control signal VCTRL1 is configured to set the transmittance to be about 10%, and the voltage amplitude of the control signal VCTRL2 is configured to set the transmittance to be about 90%. Similarly, when switching to the new third mode, the voltage amplitude of the control signal VCTRL1 is configured to set the transmittance to be about 20%, and the voltage amplitude of the control signal VCTRL2 is configured to set the transmittance to be about 80%. Accordingly, the transmittance of the gray level zone 206 is thus adjusted gradually by sequentially adjusting the voltage amplitudes of both of the control signals VCTRL1 and VCTRL2.

Alternatively, taking FIG. 4A as example, whenever the gratings are switched, the control unit 206 sequentially increases the overlapping time between the enabling period of one of the control signal VCTRL4 and the control signal VCTRL5 and the enabling period of the common control signal VCTRLCOM, and sequentially decreases the overlapping time between the enabling period of another one of the control signal VCTRL4 and the control signal VCTRL5 and the enabling period of the common control signal VCTRLCOM. For illustration, when switching to the new second mode, the ratio of the transmission time of the control signal VCTRL4 is configured to set the transmittance to be about 10%, and the ratio of the transmission time of the control signal VCTRL5 is configured to set the transmittance to be about 90%. Similarly, when switching to the new third mode, the ratio of the transmission time of the control signal VCTRL4 is configured to set the transmittance to be about 20%, and the ratio of the transmission time of the control signal VCTRL5 is configured to set the transmittance to be about 80%. Accordingly, the transmittance of the gray level zone 206 is thus adjusted gradually by sequentially adjusting the ratio of the transmission times of both of the control signals VCTRL4 and VCTRL5.

Figure 6:
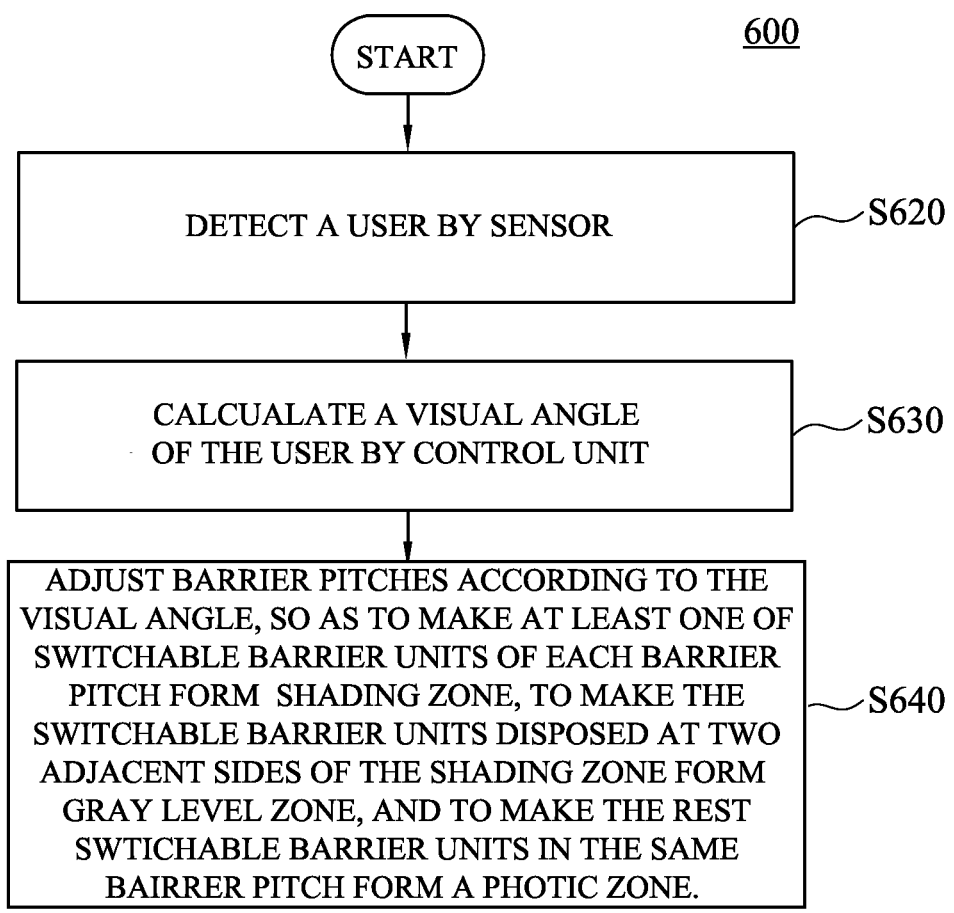
FIG. 6 is a flow chart of a driving method in accordance with one embodiment of the present disclosure.

Another aspect of the present disclosure provides a driving method for a stereoscopic display, such as the stereoscopic display 200 shown in FIG. 2A. Reference is made to FIG. 6. FIG. 6 is a flow chart of a driving method 600 in accordance with one embodiment of the present disclosure. As shown in FIG. 6, the driving method 600 includes steps S620, S630 and S640.

In step S620, as shown in FIG. 2A, the sensor 220 detects a user to generate the sensing signal Vsense.

In step S630, the visual angle of the user is calculated by the control unit 260 in accordance with the sensing signal Vsense.

In step S640, as shown in FIG. 2A, the switchable barrier units in the barrier pitches 242 are adjusted in accordance with the visual angle, so as to make at least one of the switchable barrier units of each of the barrier pitches 242 form a shading zone 202, to make the switchable barrier units disposed at two adjacent sides of the shading zone 202 form the gray level zone 206, and to make the rest of the switchable barrier units in same barrier pitch 242 form the photic zone 204. For illustration, a shown in FIG. 2C, in the switchable barrier units required to be switched, the shading zone 202 is switched to the gray level zone 206, or the photic zone 204 is switched to the gray level zone 206. Thus, the problem of flicker is improved.

In addition, in step S640, the switchable barrier units are able to be adjusted in the same manner as in the embodiment illustrated in the FIG. 4A, and the gray level zone 260 is formed by adjusting the voltage level of the control signals (e.g., VCTRL 1 and CTRLVCTRL2), so as to form the gray level zone 206.

In this embodiment, the voltage amplitude of one of the control signals VCTRL1 and the control signal VCTRL2 is sequentially increased, and the voltage amplitude of another one of the control signals VCTRL1 and the control signal VCTRL2 is sequentially decreased. Thus, the groups able to be switched in the unity barrier pitch are equivalently increased, and the smoothness of the image is improved.

Alternatively, in step S640, the switchable barrier units are able to be adjusted in the same manner as in the embodiment illustrated in FIG. 4A, and the gray level zone 260 is formed by adjusting the ratio of the overlapping time between the control signals (e.g., VCTRL4 and VCTRL5) of the switchable barrier units corresponding to the gray level zone 206, and the common control signal (e.g., VCTRLCOM) of each of the switchable barrier units, so as to form the gray level zone 206.

For illustration, the overlapping time between the enabling period of one of the control signals VCTRL4 and the control signal VCTRL5 and the enabling period of the common control signal VCTRLCOM is sequentially increased, and the overlapping time between the enabling period of another one of the control signals VCTRL4 and the control signal VCTRL5 and the enabling period of the common control signal VCTRLCOM is sequentially decreased. Thus, the luminance of the gray level zone is gradually adjusted, and the smoothness of image switching is improved.

In summary, the stereoscopic (3D) display and the driving method of the present disclosure include many driving configurations to reduce flickers on the screen, and may be applied to high-resolution displays.

It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A method for driving a stereoscopic display, the stereoscopic display comprising a barrier cell, the barrier cell comprising a plurality of barrier pitches disposed in parallel, and each of the barrier pitches comprising a plurality of switchable barrier units, the method comprising:

generating a sensing signal by utilizing a sensor to detect a user;

calculating a visual angle of the user by utilizing a control unit to process the sensing signal; and adjusting the switchable barrier units to make at least one of the switchable barrier units of each of the barrier pitches form a shading zone, to make the switchable barrier units disposed at two adjacent sides of the shading zone form a gray level zone, and to make the rest of the switchable barrier units in the same barrier pitch form a photic zone;

wherein each of the switchable barrier units comprises a control electrode and a common electrode, the common electrodes of the switchable barrier units are at a same electrical potential, and the control electrodes of the switchable barrier units of each of the barrier pitches are electrically coupled to each other, the step of adjusting the switchable barrier units comprising:

providing a common control signal to the common electrodes and the control electrodes of the switchable barrier units corresponding to the photic zone, so as to form the photic zone;

providing a first control signal and a second control signal to the control electrodes of the switchable barrier units of the two adjacent sides of the shading zone, respectively, so as to form the gray level zone; and providing a third control signal to the control electrodes of the switchable barrier units corresponding to the shading zone, wherein the common control signal is complementary to the third control signal, an enabling period of the first control signal at least partly overlaps the enabling period of the common control signal, and the enabling period of the second control signal at least partly overlaps the enabling period of the common control signal;

wherein the frequency of the common control signal is different to the frequency of the first control signal and the frequency of the second control signal.

2. The method of claim 1, the step of adjusting the switchable barrier units comprising:

applying a voltage on the least one common electrode and the control electrodes of the switchable units corresponding to the photic zone, so as to form the photic zone;

providing a first control signal and a second control signal to the control electrodes of the switchable barrier units of the two adjacent sides of the shading zone, respectively, so as to form the gray level zone; and providing a third control signal to the control electrodes of the switchable barrier units corresponding to the shading zone, so as to form the shading zone.

3. The method of claim 2, wherein whenever the switchable barrier units are adjusted, a voltage amplitude of one of the first control signal and the second control signal is sequentially increased, and the voltage amplitude of the other one of the first control signal and the second control signal is sequentially decreased.

4. The method of claim 1, wherein whenever the switchable barrier units are adjusted, the overlapping time between the enabling period of one of the first control signal and the second control signal and the enabling period of the common control signal is sequentially increased, and the overlapping time between the enabling period of the other one of the first control signal and the second control signal and the enabling period of the common control signal is sequentially decreased.

5. The method of claim 1, wherein the frequency of the common control signal, the frequency of the first control signal and the frequency of the second control signal are the same, and a phase difference is present between the phase of the first control signal and the second control signal and the phase of the common control signal.

6. The method of claim 1, wherein in each time frame, the switchable barrier units disposed at two adjacent sides of the shading zone form the gray level zone.

7. A stereoscopic display, comprising:

a barrier cell configured to generate a grating-like structure to form a 3D image with a 2D image, the barrier cell comprising a plurality of barrier pitches disposed in parallel, and each of the barrier pitches comprising a plurality of switchable barrier units;

a sensor configured to detect a user to generate a sensing signal; and a control unit configured to calculate a visual angle of the user in accordance with the sensing signal, and accordingly generate a plurality of control signals in accordance with the visual angle to adjust the switchable barrier units, so as to make at least one of the switchable barrier units of each of the barrier pitches form a shading zone, to make the switchable barrier units disposed at two adjacent sides of the shading zone form a gray level zone, and to make the rest of the switchable barrier units in the same barrier pitch form a photic zone;

wherein each of the switchable barrier units comprises a control electrode and a common electrode, the common electrodes of the switchable barrier units are at a same electrical potential, and the control electrodes of the switchable barrier units of each of the barrier pitches are electrically coupled to each other, wherein the control unit is configured to provide a common control signal to the common electrodes and the control electrodes of the switchable barrier units corresponding to the photic zone to form the photic zone in accordance with the visual angle, the control unit is configured to provide a first control signal and a second control signal to the control electrodes of the switchable barrier units of the two adjacent sides of the shading zone, respectively, to form the gray level zone in accordance with the visual angle, and the control unit is further configured to provide a third control signal to the control electrodes of the switchable barrier units corresponding to the shading zone in accordance with the visual angle;

wherein the common control signal is complementary to the third control signal, an enabling period of the first control signal at least partly overlaps the enabling period of the common control signal, and the enabling period of the second control signal at least partly overlaps the enabling period of the common control signal;

wherein the frequency of the common control signal is different to the frequency of the first control signal and the frequency of the second control signal.

8. The stereoscopic display of claim 7, wherein the control unit is configured to apply a voltage on the least one common electrode and the control electrodes of the switchable units corresponding to the photic zone to form the photic zone in accordance with the visual angle, the control unit is configured to provide a first control signal and a second control signal to the control electrodes of the switchable barrier units of the two adjacent sides of the shading zone, respectively, to form the gray level zone in accordance with the visual angle, and the control unit is further configured to provide a third control signal to the control electrodes of the switchable barrier units corresponding to the shading zone to form the shading zone in accordance with the visual angle.

9. The stereoscopic display of claim 8, wherein whenever the switchable barrier units are adjusted, the control unit sequentially increases a voltage amplitude of one of the first control signal and the second control signal and sequentially decreases the voltage amplitude of the other one of the first control signal and the second control signal.

10. The stereoscopic display of claim 7, wherein whenever the switchable barrier units are adjusted, the overlapping time between the enabling period of one of the first control signal and the second control signal and the enabling period of the common control signal is sequentially increased, and the overlapping time between the enabling period of the other one of the first control signal and the second control signal and the enabling period of the common control signal is sequentially decreased.

11. The stereoscopic display of claim 7, wherein a phase difference is present between the phase of the first control signal and the second control signal and the phase of the common control signal.

\* \* \* \* \*